(12) United States Patent
Petrucci et al.

(10) Patent No.: US 8,606,178 B2
(45) Date of Patent: Dec. 10, 2013

(54) MULTI-DIRECTIONAL WIRELESS COMMUNICATION FOR A CONTROL MODULE

(75) Inventors: David R. Petrucci, Warren, MI (US); Mark A. Wisnewski, Stockbridge, MI (US); Charles A. Massoll, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 305 days.

(21) Appl. No.: 13/043,039

(22) Filed: Mar. 8, 2011

(65) Prior Publication Data
US 2012/0231754 A1    Sep. 13, 2012

(51) Int. Cl.
*H04B 7/00* (2006.01)

(52) U.S. Cl.
USPC ....... 455/41.1; 455/41.2; 455/41.3; 455/90.1; 455/90.3; 455/575.1; 455/575.9; 455/78; 455/88; 455/82; 455/127.2; 455/91; 455/139; 455/278.1; 455/136; 342/361; 342/372; 342/375; 342/175; 342/371

(58) Field of Classification Search
USPC .................. 455/41.1–41.3, 90.1, 90.3, 575.1, 455/575.9, 78, 82, 88, 127.2, 91, 139, 455/278.1, 136, 151.4; 342/361, 372, 375, 342/175, 371, 247, 359, 157, 368; 361/719, 361/736, 93.1, 732, 704, 710, 636, 642, 361/730, 674, 818
See application file for complete search history.

(56) References Cited

U.S. PATENT DOCUMENTS

| | | | | |
|---|---|---|---|---|
| 5,027,125 | A * | 6/1991 | Tang | 342/368 |
| 5,479,176 | A * | 12/1995 | Zavrel, Jr. | 342/374 |
| 5,767,807 | A * | 6/1998 | Pritchett | 342/374 |
| 2005/0088826 | A1* | 4/2005 | Throum | 361/719 |
| 2005/0237258 | A1* | 10/2005 | Abramov et al. | 343/834 |
| 2006/0246895 | A1* | 11/2006 | Ryu | 455/434 |
| 2009/0251362 | A1* | 10/2009 | Margomenos et al. | 342/175 |

\* cited by examiner

*Primary Examiner* — Fayyaz Alam
*Assistant Examiner* — Ganiyu A Hanidu
(74) *Attorney, Agent, or Firm* — Cantor Colburn LLP

(57) ABSTRACT

An electronic control module assembly includes antenna elements and a PCB. Each antenna element communicates an RF signal in a direction that corresponds with an outer face of a housing of the assembly. The PCB is received in a cavity of the housing and has RF-energy-transfer circuits and a baseband RF device, which demodulates the signal. Each RF-energy-transfer circuit receives the signal. At least two RF-energy-transfer circuits receive the signal from the antenna elements, and at least one RF-energy-transfer circuit does not receive the signal from one of the antenna elements and is a placeholder circuit. The baseband RF device is in communication with at least two of the RF-energy-transfer circuits receiving the signal. A connector provides a connection between each of the antenna elements and the PCB and is received by an aperture of the housing.

12 Claims, 3 Drawing Sheets

MULTI-DIRECTIONAL WIRELESS COMMUNICATION FOR A CONTROL MODULE

FIELD OF THE INVENTION

Exemplary embodiments of the invention relate to an electronic control module assembly and, more particularly, to an electronic control module assembly having a plurality of radio frequency (RF) energy transfer circuits.

BACKGROUND

Wireless communication features such as, for example, Global Positioning Systems (GPS) or satellite radio are commonly available in motor vehicle, aircraft and other transportation applications as well as in stationary applications. One or more control modules having radio frequency (RF) communication capabilities are used to provide wireless communication features. The control modules are typically packaged within the system. For example, the control module may be packaged within a motor vehicle in a variety of locations such as behind the glove box, or adjacent the HVAC air handling unit. However, several issues may arise when attempting to determine the specific location and orientation of the control module within a vehicle or other application.

The control module typically includes an antenna element fixedly located either within or on the control module. Specifically, the antenna element may be located either on the exterior surface of the housing of the control module, or alternatively on a printed circuit board (PCB) located within the housing. The control module also includes one or more specific protection zones. The protection zones are areas of the control module that have transmitting and receiving antennas for receiving other types of RF communication signals such as, for example, a Bluetooth® or Wi-Fi® signal. These protection zones represent areas where reception of the antenna element should not substantially interfere with the other types of RF communication signals. Sometimes integration and layout conflicts arise when determining the specific location of the antenna element versus the protection zones on the control module.

The issue of antenna element placement is further compounded when the control module is used in several different applications. In one example a specific type of control module is used in several different vehicle models or types of applications. Having a common control module between different types of applications typically increases integration efficiency while reducing cost. However, each application will include unique packaging constraints. Therefore, it becomes especially difficult to determine the specific location of the antenna element on the control module if multiple applications are involved. Accordingly, it is desirable to provide a control module having an antenna element location that is flexible and can be changed to accommodate a variety of different applications.

SUMMARY OF THE INVENTION

In one exemplary embodiment of the invention, an electronic control module assembly is provided. The electronic control module assembly includes a plurality of antenna elements and a printed circuit board (PCB). Each antenna element communicates a radio frequency (RF) signal. The PCB has a plurality of radio frequency (RF) energy transfer circuits and a baseband device. The plurality of RF energy transfer circuits are each configured to receive the RF signal. At least two of the RF energy transfer circuits receive the RF signal from the antenna elements. The baseband RF device is in communication with the at least two of the plurality of RF energy transfer circuits which receive the RF signal. The baseband processor is configured for demodulating the RF signal.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
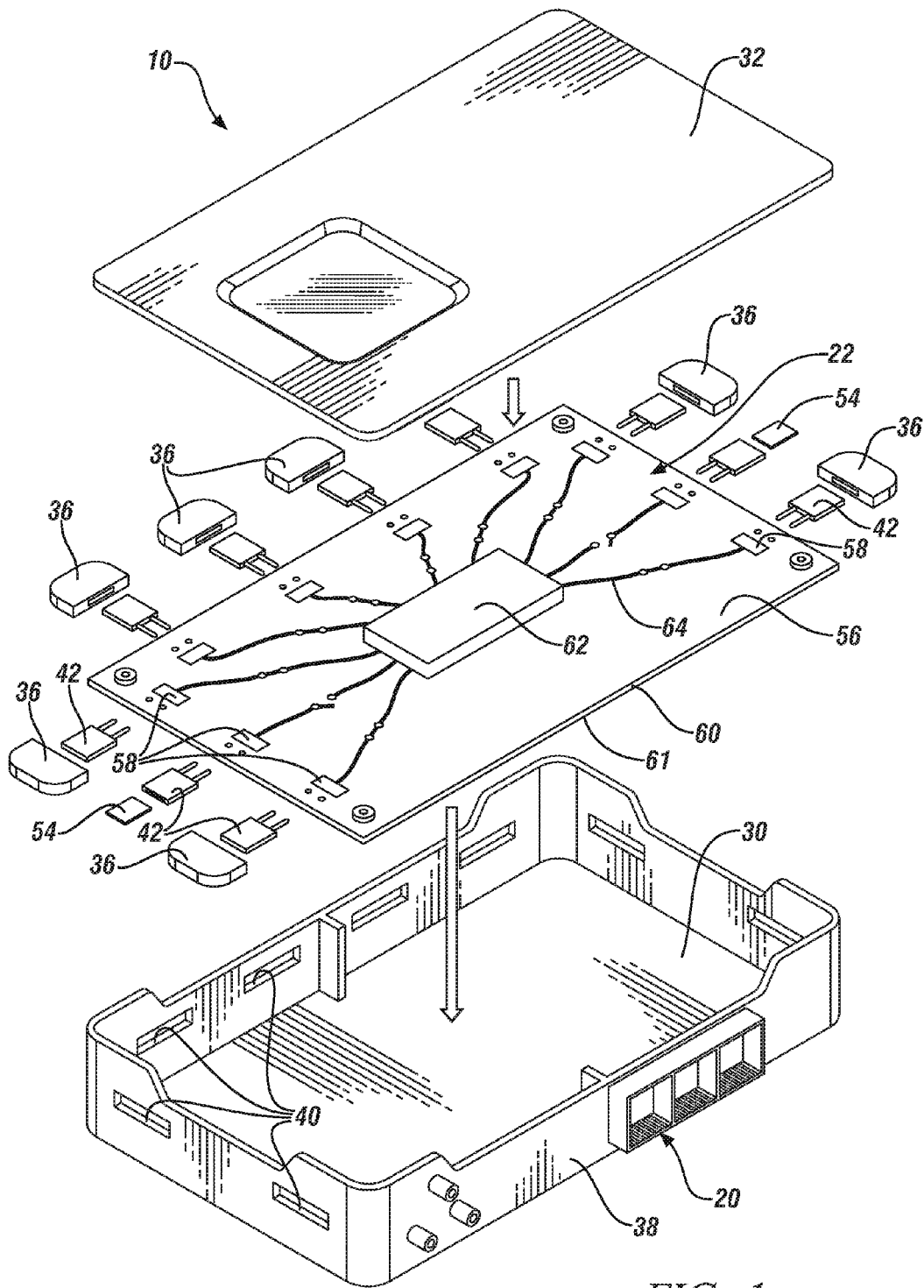
FIG. 1 is a disassembled view of a control module assembly having a housing and a printed circuit board (PCB)

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention FIG. 1 is an illustration of an electronic control module assembly 10. As used herein the terms module and submodule refer to an application specific integrated circuit (ASIC), an electronic circuit, a processor (shared, dedicated, or group) and memory that executes one or more software or firmware programs, a combinational logic circuit, and/or other suitable components that provide the described functionality. The control module assembly 10 includes a housing 20 and a printed circuit board (PCB) 22. The housing 20 includes a cavity 30 for receiving the PCB 22, and a housing cover 32 closing the cavity 30. In one embodiment, the control module assembly 10 is employed within a motor vehicle, however it is understood that the control module assembly 10 may be used in other applications as well such as, for example, aircraft or other types of transportation applications.

Figure 4:
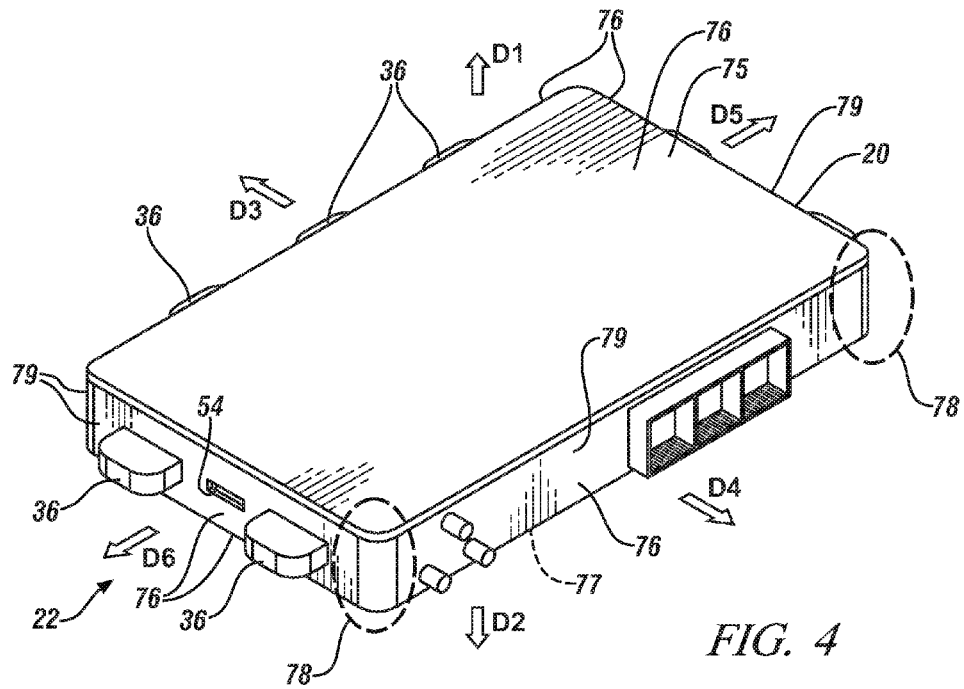
FIG. 4 is a perspective view of the control module assembly illustrated in FIG. 1.

The control module assembly 10 includes radio frequency (RF) capability for sending and receiving RF signals. For example, in one embodiment the control module assembly 10 may be an OnStar® control module assembly having cellular RF signal capabilities. The control module assembly 10 includes a plurality of antenna elements 36 for communicating RF signals. In one embodiment, the plurality of antenna elements 36 are externally positioned along an exterior surface 38 of the housing 20, which is illustrated in FIG. 4, however it is understood that in an alternative embodiment the antenna elements 36 could be located within and flush with the housing 20 as well. Having the antenna elements 36 located within the housing 20 may result in greater flexibility with packaging. A connector 42 corresponds with each antenna element 36, where the connectors 42 are used to connect each of the antenna elements 36 to the PCB board 22.

Each of the connectors 42 are received by a corresponding aperture 40 located within the housing 20.

Figure 2:
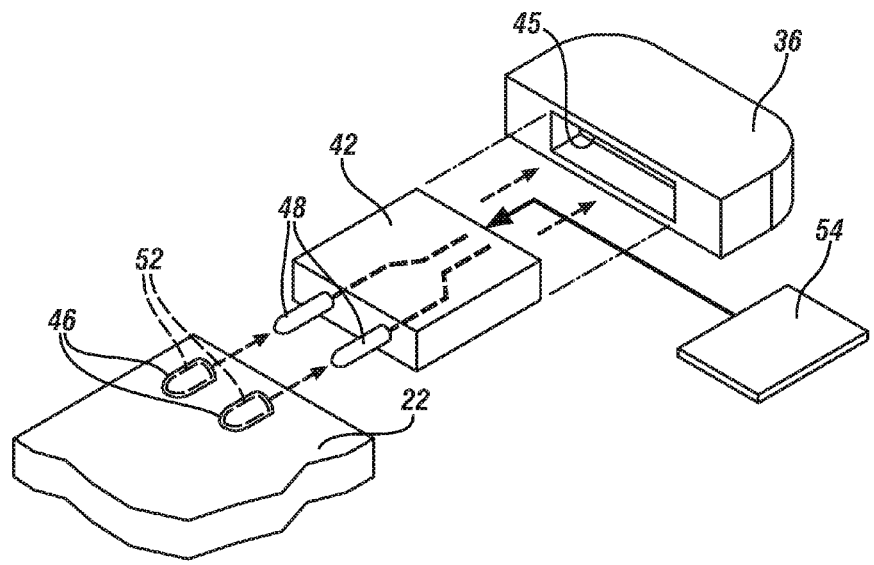
FIG. 2 is an enlarged, partial view of the PCB, a connector, and an antenna element.

FIG. 2 is an enlarged partial view of the PCB 22, one of the connectors 42, and one of the antenna elements 36. The PCB board includes a set of mating features 46 that connect to a pair of corresponding reciprocal mating features 48 located on the connector 42, and the antenna element 36 includes an aperture 45 that receives the connector 42. In the exemplary embodiment as shown, the mating features 46 of the PCB 22 are a pair of raised projections that each have an aperture 52, and the reciprocal mating features 48 of the connector 42 are a pair of protuberances. The mating features 48 of the connector 42 are received by the apertures 52 located in the PCB 22 to connect the PCB 22 to the connector 42. Although FIG. 2 illustrates mating features 46 and 48, it is understood that the connector 42 could be connected to the PCB 22 in a variety of different approaches such as, for example, a snap-fit connection, soldering, or other suitable method of attachment. Moreover, although FIG. 2 illustrates the antenna 36 having an aperture 45 for receiving the connector 42, it is understood that other approaches may be used as well to connect the antenna 36 to the PCB 22. For example, in an alternative embodiment the connector 42 and the antenna 36 may be combined into a single, integrated part, where the combined connector and antenna assembly connect directly to the PCB 22.

Referring now to FIGS. 1 and 2, the control module assembly 10 is configured such that the antenna elements 36 can each be selectively added to the control module assembly 10 depending on the specific application packaging and layout requirements thereof. During assembly of the control module assembly 10, either an antenna element 36 or an inoperable blank 54 can link to the connector 42. Specifically, depending on the packaging requirements of the control module assembly 10, if placement of an antenna element 36 is not required, then the corresponding connector 44 receives a blank 54 instead of an antenna element 36. The blank 54 may be constructed from a metal based material, and operates as a dummy resistance substituted in place of the antenna element 36.

Referring again to FIG. 1, a top surface 56 (as viewed in the figure) of the PCB 22 includes a plurality of radio frequency energy transfer circuits 58. Although FIG. 1 illustrates the plurality of radio frequency energy transfer circuits 58 located on the top surface 56, it is understood that the plurality of radio frequency energy transfer circuits 58 are not location specific, and may also be located on one or more of side surfaces 60, or a bottom surface 61 of the PCB 22. At least two of the RF energy transfer circuits 58 receive the RF signal. Specifically, at least two of the RF energy transfer circuits 58 receive the RF signal from one of the antenna elements 36. In the embodiment as shown, a portion of the RF energy transfer circuits 58 are in communication with a corresponding antenna element 36 for receiving RF signals, while the remaining RF energy transfer circuits 44 act as placeholders and correspond to one of the blanks 54. Although not all of the RF energy transfer circuits 44 receive RF signals from a corresponding antenna element 36, each RF energy transfer circuit 44 includes circuitry that is configured for receiving RF signals. The PCB 22 also includes a baseband RF device 62 located, in the embodiment as shown, on the top surface 56. The baseband RF device 62 is any device that demodulates the RF signal received from the RF energy transfer circuits 58. The baseband RF device 62 may include circuitry and components such as, for example, a microprocessor or a transceiver. The baseband RF device communicates with two or more of the RF energy transfer circuits 58 though conductive pathways 64. Specifically, the baseband RF device 62 is in communication with each RF energy transfer circuit 58 that receives RF signals from a corresponding antenna element 36.

Figure 3:
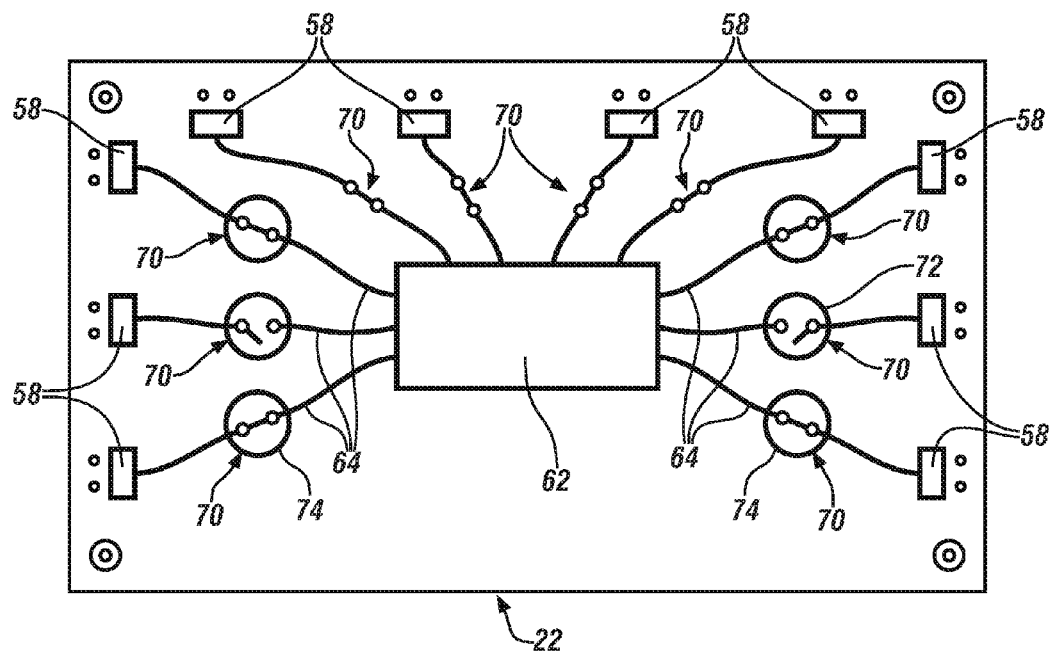
FIG. 3 is a plan view of the PCB illustrated in FIG. 1.

FIG. 3 is an enlarged view of the PCB 22 illustrated in FIG. 1. Each of the conductive pathways 64 selectively connects the baseband RF device 62 to one of the RF energy transfer circuits 58. Each conductive pathway 64 includes a switch element 70 that is either in an OPEN position indicated by reference number 72, or in a CLOSED position indicated by reference number 74. In the embodiment as shown, the switch elements 70 are single-pole single throw switches. The switch element 70 is in the OPEN position if the corresponding RF energy transfer circuit 58 does not receive RF signals from a corresponding antenna element 36, and instead the corresponding connector 42 receives a blank 54 (shown in FIG. 1). The switch element 70 is in the CLOSED position if the corresponding RF energy transfer circuit 58 receives RF signals from a corresponding antenna element 36 (shown in FIG. 1), and allows for communication between the baseband RF device 62 and the corresponding RF energy transfer circuit 58. Although FIG. 3 illustrates switches, it is understood that other devices may be used as well to selectively connect the baseband RF device 62 and the RF energy transfer circuits 58. For example, in another alternative embodiment a zero-ohm jumper is used to complete the connection between the baseband RF device 62 and the corresponding RF energy transfer circuit 58.

FIG. 4 is an illustration of an assembled control module assembly 10, wherein the antenna elements 36 are located outside of the housing 20. The housing 20 of the control module assembly 10 includes a plurality of outer faces 76. In the exemplary embodiment as shown, the housing 20 includes a generally rectangular shape and includes six different outer faces 76, however it is understood that the housing could have different configurations as well. For example, the housing 20 could have a different number of outer faces 76, or could include a square or round shape. FIG. 4 illustrates the antenna elements 36 located on three different outer faces 76 of the control module assembly 10, however it is understood that the antenna elements 36 may be placed in other locations on the control module assembly 10 as well. The antenna elements 36 are positioned to communicate RF signals in at least two directions. Positioning the antenna elements 36 in at least two directions provides a wider range of antenna gain when compared to a single antenna element. Increased antenna gain generally provides improved RF signal reception. The outer faces 76 each correspond with a direction, where a top surface 75 corresponds with a direction D1, a bottom surface 77 corresponds with a direction D2, and four side surfaces 79 each correspond with a direction D3, D4, D5 and D6. In the embodiment as shown, the antenna elements 36 communicate the RF signal in three different directions, D3, D5, and D6. However, it is understood that antenna elements 136 may be placed in any of the directions D1, D2, D3, D4, D5 or D6.

The specific location of each of the antenna elements 36 depends on a variety of different factors. First, the control module assembly 10 typically includes one or more specific protection zones 78. The protection zones 78 are areas of the control module assembly 10 that have transmitting and receiving antennas located within the housing 20 (not shown) for receiving RF signal types other than the RF signals transmitted and received from the antenna elements 36. For example, in one embodiment the antenna elements 36 are for communicating cellular RF signals and the antenna in the protection zone 78 are for sending and receiving Bluetooth® RF signals. The antenna elements 36 are positioned in relation to the control module assembly 10 such that the RF signal communications of the antenna elements 36 should not substantially interfere with RF reception of the antennas in the protection zones 78. Also, the control module assembly 10 is typically used in a variety of different applications. In one embodiment the control module assembly 10 may be used across several different vehicle lines. However, each vehicle line includes unique packaging constraints, which can sometimes be difficult to accommodate when using a single type of control module. For example, an antenna element 36 located in one specific location on the control module assembly 10, to accommodate the layout of one particular type of vehicle for instance, might potentially create a physical interference when packaged in another type of vehicle. In addition to the interference issue, an antenna element 36 located in one specific location of the control module may provide adequate reception in one type of vehicle, but because of vehicle packaging and layout differences, the antenna element 36 may not provide adequate reception in another type of vehicle.

In an effort to accommodate the unique packaging requirements of a specific application, the antenna elements 36 can each be selectively added to the control module assembly 10. Either an antenna element 36 or a blank 54 is linked to each connector 42 (shown in FIG. 1). Then, referring to FIG. 3, the switch elements 70 are placed in the CLOSED position if the corresponding RF energy transfer circuit 58 receives RF signals from a corresponding antenna element 36. In one embodiment, the baseband RF device 62, or another processor (not shown), may include control logic for automatically switching the switch elements 70 into the CLOSED position depending on the desired configuration of the control module assembly 10. Providing antenna elements 36 that can be selectively added to the control module assembly 10, depending on the application, allows for common parts to be used for the housing 20 and the PCB board 22 across a variety of different applications. Providing common parts between applications generally increases integration efficiency while lowering cost.

Figure 5:
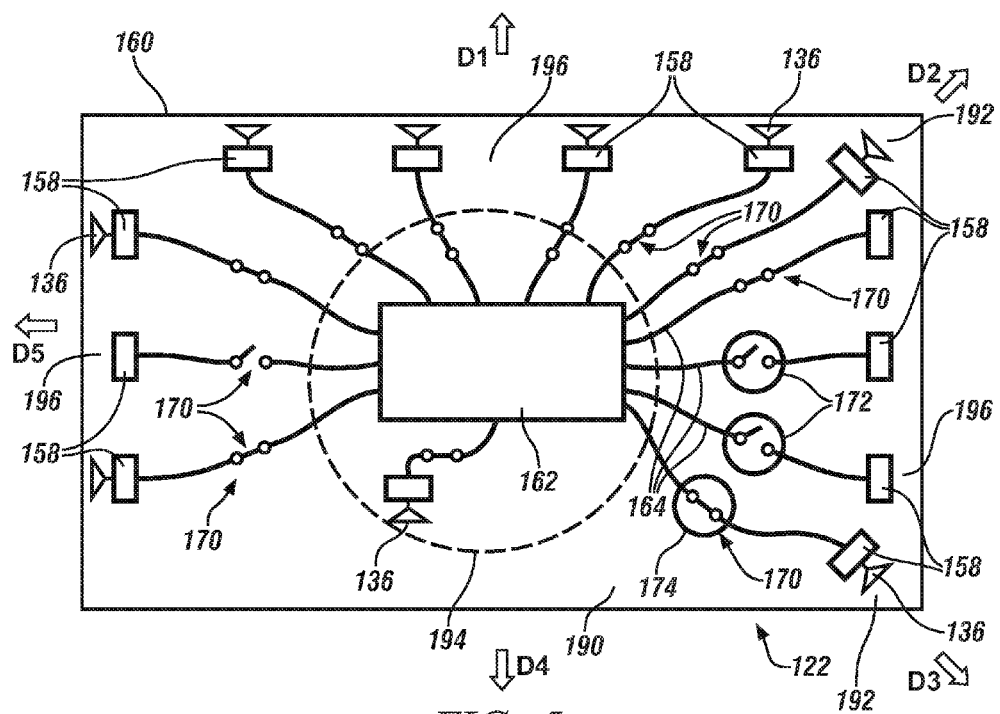
FIG. 5 is a plan view of an alternative embodiment of the PCB.

Although FIG. 1 illustrates an external antenna element, it is understood that the antenna elements may also be located within the cavity 30 of the housing 20. FIG. 5 is an alternative embodiment of a PCB 122 where the antenna elements 136 are located on the PCB 122. In the embodiment as shown, the antenna elements 136 are chip antennas that are sized to fit on the PCB 122. The antenna elements 136 are each in communication with an RF energy transfer circuit 158. If one of the energy transfer circuits 158 is not provided with an antenna element 136 for communicating RF signals, then a dummy load device or a termination device may be used in place of the antenna element 136, similar to the embodiment as shown in FIG. 1. A conductive pathway 164 selectively connects a baseband RF device 162 to one of the RF energy transfer circuits 158. Each conductive pathway 164 includes a switch element 170 that is either in an OPEN position indicated by reference number 172, or in a CLOSED position indicated by reference number 174.

The antenna elements 136 can be positioned on the PCB 122 in a variety of different locations such as outer surface 190 of the PCB 122. For example, in the embodiment as shown, the antenna elements 136 are placed in the corners 192 of the PCB 122, one of the antenna elements 136 is positioned in a central location 194 of the PCB 122, and several of the antenna elements 136 are placed along one of the outer edges 196 of the PCB 122. The antenna elements 136 are positioned to communicate RF signals in more than one direction, which provides a wider range of antenna gain when compared to a single antenna element. In the embodiment as shown, the antenna elements 136 communicate the RF signal in five directions D1, D2, D3, D4 and D5, where each of the five directions D1, D2, D3, D4 and D5 radiate outwardly from the central location 194 of the PCB 122. Although FIG. 5 illustrates each of the antenna elements 136 positioned on surface 190 of the PCB 122, it is understood that the antenna elements 136 may be positioned along any other surface of the PCB 122 as well. For example, the antenna elements 136 could be positioned along a side surface or edge 160 of the PCB 122 or on a back surface of the PCB 122 (shown in FIG. 1 as reference number 61).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An electronic control module assembly, comprising:
 a plurality of antenna elements, wherein each antenna element communicates a radio frequency (RF) signal;
 a printed circuit board (PCB), the PCB having:
  a plurality of radio frequency (RF) energy transfer circuits that are each configured to receive the RF signal, wherein at least two of the plurality of RF energy transfer circuits receive the RF signal from the plurality of antenna elements and at least one of the RF energy transfer circuits does not receive the RF signal from one of the antenna elements and is a placeholder circuit; and
  a baseband RF device in communication with the at least two of the plurality of RF energy transfer circuits which receive the RF signal, wherein the baseband processor is configured for demodulating the RF signal;
 a housing that has a plurality of outer faces and apertures and a cavity therein, wherein the PCB is received by the cavity, each of the antenna elements is positioned to communicate the RF signal in a direction that corresponds with one of the outer faces of the housing; and
 a connector provided for each of the antenna elements, wherein the connector provides a connection between the antenna element and the PCB and is received by one of the apertures.

2. The electronic control module assembly of claim 1, wherein the plurality of antenna elements are located on the PCB.

3. The electronic control module assembly of claim 2, wherein the antenna elements communicate the RF signal in at least two directions, wherein each of the two directions radiate outwardly from a central location of the PCB.

4. The electronic control module assembly of claim 1, wherein each of the antenna elements are located outside of the housing of the control module assembly.

5. The electronic control module assembly of claim 1, wherein a corresponding connector of the placeholder circuit receives a blank that operates as a dummy resistance.

6. The electronic control module assembly of claim 1, wherein the PCB includes a plurality of mating features, wherein each of the plurality of mating features receive one of the connectors.

7. The electronic control module assembly of claim 1, including a plurality of conductive pathways located on a surface of the PCB, wherein each of the plurality of RF energy transfer circuits are in selective communication with the baseband RF device through one of the plurality of conductive pathways.

8. The electronic control module assembly of claim 7, wherein each of the plurality of conductive pathways include a switch element that is in one of an open position and a closed position.

9. An electronic control module assembly, comprising:
   a housing having a plurality of outer faces and apertures and a cavity therein;
   a plurality of antenna elements, wherein each antenna element communicates a radio frequency (RF) signal;
   a printed circuit board (PCB) that is received by the cavity of the housing, the PCB having:
      a plurality of radio frequency (RF) energy transfer circuits that are each configured to receive the RF signal, wherein at least two of the plurality of RF energy transfer circuits receive the RF signal from the plurality of antenna elements and at least one of the RF energy transfer circuits does not receive the RF signal from one of the antenna elements and is a placeholder circuit; and
      a baseband RF device in communication with the at least two of the plurality of RF energy transfer circuits which receive the RF signal, wherein the baseband processor is configured for demodulating the RF signal; and
   a connector provided for each of the antenna elements, wherein the connector provides a connection between the antenna element and the PCB and is received by one of the plurality of apertures and a corresponding connector of the placeholder circuit receives a blank that operates as a dummy resistance,
   wherein each of the antenna elements is positioned to communicate the RF signal in a direction that corresponds with one of the plurality of outer faces of the housing.

10. The electronic control module assembly of claim 9, including a plurality of conductive pathways located on a surface of the PCB, wherein each of the plurality of RF energy transfer circuits are in selective communication with the baseband RF device through one of the plurality of conductive pathways.

11. The electronic control module assembly of claim 10, wherein each of the plurality of conductive pathways include a switch element that is in one of an open position and a closed position.

12. An electronic control module assembly, comprising:
   a housing having a plurality of outer faces, a cavity located therein, and a plurality of apertures located therein;
   a plurality of antenna elements, wherein each antenna element communicates a radio frequency (RF) signal in a direction that corresponds with one of the outer faces of the housing;
   a printed circuit board (PCB) that is received by the cavity of the housing, the PCB having:
      a plurality of radio frequency (RF) energy transfer circuits that are each configured to receive the RF signal, wherein at least two of the plurality of RF energy transfer circuits receive the RF signal from the plurality of antenna elements and at least one of the RF energy transfer circuits does not receive the RF signal from one of the antenna elements and is a placeholder circuit;
      a baseband RF device in communication with the at least two of the plurality of RF energy transfer circuits which receive the RF signal, wherein the baseband processor is configured for demodulating the RF signal; and
      a plurality of conductive pathways located on a surface of the PCB, wherein each of the plurality of RF energy transfer circuits are in selective communication with the baseband RF device through one of the plurality of conductive pathways, and wherein each of the plurality of conductive pathways include a switch element that is in one of an open position and a closed position; and
   a connector provided for each of the plurality of the antenna elements, wherein the connector provides a connection between the antenna element and the PCB, and wherein each connector is received by one of the plurality of apertures of the housing, and
   wherein each of the antenna elements are positioned to communicate the RF signal in a direction that corresponds with one of the plurality of outer faces of the housing.

\* \* \* \* \*